(12) United States Patent
Kangas et al.

(10) Patent No.: US 9,916,217 B2
(45) Date of Patent: Mar. 13, 2018

(54) ACCESSING HIDDEN DIAGNOSTIC REGISTERS

(71) Applicant: Lenovo Enterprise Solutions (Singapore) Pte. Ltd., Singapore (SG)

(72) Inventors: Paul D. Kangas, Raleigh, NC (US); Dustin Patterson, Durham, NC (US); Mehul Shah, Austin, TX (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 79 days.

(21) Appl. No.: 14/987,981

(22) Filed: Jan. 5, 2016

(65) Prior Publication Data

US 2017/0192870 A1   Jul. 6, 2017

(51) Int. Cl.
*G06F 11/00* (2006.01)
*G06F 11/273* (2006.01)
*G06F 11/22* (2006.01)

(52) U.S. Cl.
CPC ........ *G06F 11/273* (2013.01); *G06F 11/2236* (2013.01)

(58) Field of Classification Search
CPC .................................................... G06F 11/273
USPC .............................. 714/31, 30, 34, 733, 734
See application file for complete search history.

(56) References Cited

U.S. PATENT DOCUMENTS

| | | | | |
|---|---|---|---|---|
| 4,519,028 A | * | 5/1985 | Olsen | G06F 13/24 712/33 |
| 5,287,503 A | * | 2/1994 | Narad | G06F 9/30018 710/220 |
| 5,347,523 A | * | 9/1994 | Khatri | G01R 31/318552 365/201 |
| 5,867,717 A | * | 2/1999 | Milhaupt | G06F 1/08 712/32 |
| 8,090,932 B1 | * | 1/2012 | Kwan | G06F 3/0608 712/220 |

* cited by examiner

*Primary Examiner* — Dieu-Minh Le
(74) *Attorney, Agent, or Firm* — Jeffrey L. Streets

(57) ABSTRACT

A system includes a CPU including a primary address decode logic module (PADLM) and a plurality of diagnostic registers, wherein the PADLM includes address bus inputs, and an enable input port. The system further includes a data flip-flop having a data input coupled to a master enable signal line, a set input coupled to an interrupt signal line, an output coupled to the enable input port of the PADLM, and a clock input. Still further, the system includes an address decode logic module having a memory address input and an output indicating whether the memory address is within a predetermined address range of the diagnostic registers, wherein the output of the address decode logic module is coupled to the clock input. Memory mapping is enabled in response to receiving an interrupt signal and determining that the memory address is within a predetermined range of memory addresses for diagnostic registers.

20 Claims, 3 Drawing Sheets

ACCESSING HIDDEN DIAGNOSTIC REGISTERS

BACKGROUND

Field of the Invention

The present invention relates to diagnostic systems and methods for determined the cause or source of an error or interrupt occurring within a computer.

Background of the Related Art

Currently, some processor manufacturers require Unified Extensible Firmware Interface (UEFI) Power-On Self-Test (POST) code to hide or lock certain diagnostic registers such that those diagnostic registers are inaccessible after POST completes. Accordingly, these diagnostic registers are accessible for only a very short time during POST. The CPU logic that is designed into the silicon chip is responsible for the diagnostic registers becoming "hidden" or "locked."

Diagnostic registers are often hidden from production run-time level code in order to prevent unauthorized usage of the diagnostic registers by users or applications. The decode logic of the processor hides or locks the diagnostic registers by modifying the Memory or I/O map to remove pointers to the diagnostic registers. However, while removing the diagnostic registers from the memory map prevents unauthorized use of the registers, this also prevents any useful diagnostic code from using the diagnostic registers to identify and analyze failed components.

Diagnostic code or a diagnostic program may run on the same processor where the diagnostic registers are located. The diagnostic code or diagnostic program may be any code that is trying to either service a real-time interrupt that is signaling an error condition, or a stand-alone diagnostic program that a technician or remote system administrator may run in order to get more information about a reported error. For example, diagnostic code running on a main CPU may diagnose a PCIe adapter card error occurring within the same computer as the main CPU, yet the diagnostic code may not be able to identify the exact type of PCIe error because information relevant to the type of error may be held in diagnostic registers that are hidden from the diagnostic code.

BRIEF SUMMARY

One embodiment of the present invention provides a system, comprising a central processing unit including a primary address decode logic module and a plurality of diagnostic registers, wherein the primary address decode logic module includes inputs from an address bus, and an enable input port. The system further comprises a data flip-flop having a data input coupled to a master enable signal line, a set input coupled to an error interrupt signal line, an output coupled to the enable input port of the primary address decode logic module, and a clock input. Still further, the system comprises an address decode logic module having an input receiving a memory address and an output indicating whether the memory address is within a predetermined address range of the diagnostic registers, wherein the output of the address decode logic module is coupled to the clock input of the data flip-flop.

Another embodiment of the present invention provides a method comprising receiving an error interrupt signal from a component of a computer, receiving a read command from diagnostic code identifying a memory address of a diagnostic register within the computer, and enabling memory mapping to the identified diagnostic register in response to receiving the error interrupt signal and determining that the memory address of the identified diagnostic register is within a predetermined range of memory addresses for diagnostic registers.

DETAILED DESCRIPTION

Figure 1:
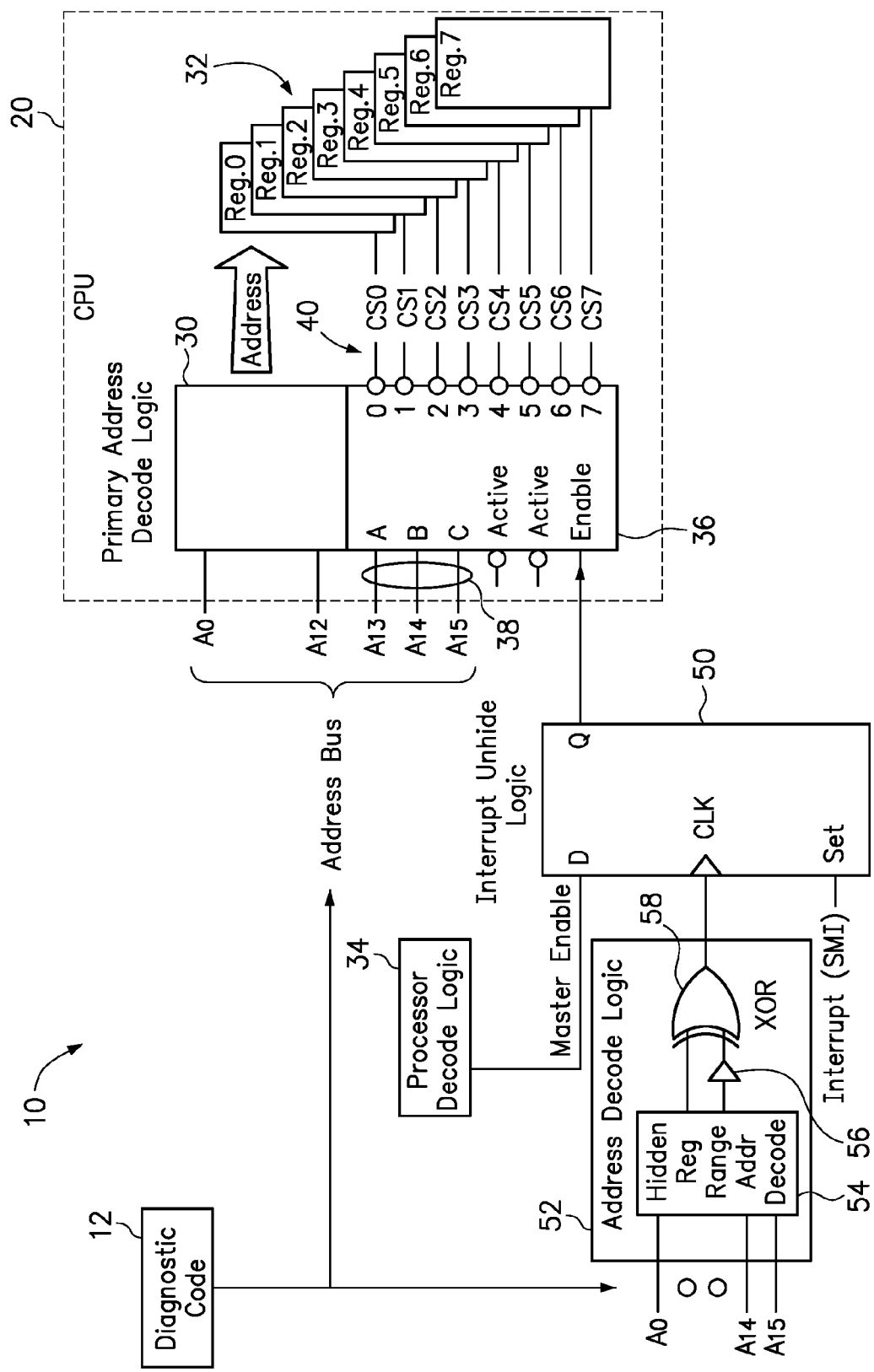
FIG. 1 is a diagram of a system for enabling access to a diagnostic register in response to an error interrupt signal.

One embodiment of the present invention provides a system, comprising a central processing unit including a primary address decode logic module and a plurality of diagnostic registers, wherein the primary address decode logic module includes inputs from an address bus, and an enable input port. The system further comprises a data flip-flop having a data input coupled to a master enable signal line, a set input coupled to an error interrupt signal line, an output coupled to the enable input port of the primary address decode logic module, and a clock input. Still further, the system comprises an address decode logic module having an input receiving a memory address and an output indicating whether the memory address is within a predetermined address range of the diagnostic registers, wherein the output of the address decode logic module is coupled to the clock input of the data flip-flop.

The address decode logic module preferably provides a false output unless the memory address is within the range of hidden register addresses. However, an address within the predetermined address range may cause the address decode logic to output a true output to the clock input such that the data flip-flop loads the state of the master enable signal into a memory element within the D flip-flop. Optionally, a true signal to the set input and a true signal to the clock input will cause the output of the data flip-flop to enable the primary address decode logic module. Enabling the primary address decode logic module allows a hidden register associated with the memory address value to be accessed. In a further option, reading from or writing to the diagnostic register returns the state of the master enable signal back into the flip-flop memory and onto the data flip-flop output to the enable input port of primary address decode logic module.

The system may, without limitation, be selected from a computing server, desktop computer, laptop computer, and mobile computing device. Independently, the central processing unit may execute diagnostic code for reading one or more of the diagnostic registers in response to an error interrupt signal. For example, the diagnostic code may, without limitation, be selected from UEFI code, BMC service processor code, and a diagnostic application program.

Another embodiment of the present invention provides a method comprising receiving an error interrupt signal from a component of a computer, receiving a read command from diagnostic code identifying a memory address of a diagnostic register within the computer, and enabling memory mapping to the identified diagnostic register in response to receiving the error interrupt signal and determining that the memory address of the identified diagnostic register is within a predetermined range of memory addresses for diagnostic registers. The identified diagnostic register preferably stores information about an error condition associated with the error interrupt signal. Optionally, the error interrupt is a system management interrupt.

One embodiment of the method further comprises receiving a master enable signal from decode logic of a chipset of the computer, wherein the master enable signal indicates that memory mapping to the diagnostic registers should be disabled. The step of enabling memory mapping to the identified diagnostic register in response to receiving the error interrupt signal and determining that the memory address of the identified diagnostic register is within a predetermined range of memory addresses for diagnostic registers, includes overriding the master enable signal.

Another embodiment of the method further comprises reading the content of the identified diagnostic register, and automatically disabling the memory mapping to the diagnostic registers in response to reading the content of the identified diagnostic register. The method optionally includes changing the memory address associated with the identified diagnostic register each time the diagnostic register is read.

A further embodiment of the method further comprises the diagnostic code reading multiple diagnostic registers while memory mapping is enabled. A similar embodiment of the method further comprises reading a first diagnostic register to identify a type of the error, and reading a second diagnostic register to identify a source of the error, wherein the second register is selected on the basis of the type of the error read from the first register.

In one option, memory mapping to the diagnostic registers is disable in response to expiration of a time interval after enabling memory mapping to the diagnostic registers. In a separate option, memory mapping to the diagnostic registers is disabled in response to the diagnostic code issuing an instruction to disable memory mapping to the diagnostic registers.

Embodiments of the present invention allow greater use of the diagnostic registers while also preventing unauthorized access to the diagnostic registers. Accordingly, detailed error information that is contained in the diagnostic registers remains generally inaccessible, but may be accessed ("unhidden") during short and temporary time periods of accessibility. The "diagnostic registers" or "diagnostic registers" may include, without limitation, any command register or status register that may be used for diagnostics. However, the registers preferably give detailed information about an error, even if those registers are not generally known to the public.

In the example of a PCI Express related failure, existing systems will report a general PCIe bus error to a system event log. However, the present invention makes it possible for the system firmware, such as UEFI code, BMC service processor code, or a stand-alone diagnostic program (i.e., any code that may be attempting to determine more detailed information related to a general error alert) to determine which Lane on a 16 Lane PCIe bus has bad signal quality and is causing the errors. By allowing diagnostic code to access the diagnostic registers according to embodiments of the present invention, the diagnostic code may identify which lane is bad and take steps to adjust equalization settings for the identified lane in order to improve signal quality on the lane, or notify a technician or administrator to make a visual inspection of a certain connector contact or PCIe cable wire that is associated with the lane.

Embodiments of the present invention provide diagnostic code, executable by a processor, with a diagnostic mode allowing diagnostic registers to be accessed for a brief period of time in response to an error condition. Accordingly, the diagnostic code may include a set of instructions associated with the diagnostic mode, which set of instructions may be added to existing diagnostic code, an interrupt service routine, UEFI code, or any other diagnostic code that has a need to get more information for an error condition.

Embodiments of the present invention may be implemented in any electronic device that uses a CPU, has registers containing information about error conditions, and has a need to hide some of those registers to prevent general access by unauthorized users or applications. Specific non-limiting examples of such electronic devices include a computing server, desktop computer, laptop computer, table computer and mobile communication device.

In modern computer architecture (Intel x86, power PC, etc.), most subsystems now have a reporting mechanism that facilitates detection and communication of error conditions. For example, the error reporting mechanism may include in-band error messaging and error indicators associated with various errors or conditions, such as high temperature, correctable error indication, and bus size changes. The UEFI code and/or BMC service processor code has error handler code that may receive these error indicators, generate a real-time error indicator (such as a message on a display screen or energizing an LED of a diagnostic panel), and write the error to an event log.

Embodiments of the present invention allow the diagnostic code to access the diagnostic registers, and then hide the registers again after obtaining information about one or more errors from the diagnostic registers. The diagnostic code maintains a high level of security by enabling the memory mapping or I/O mapping for certain registers for only a short period of time and only when an actual error occurs. During the short period of time that the diagnostic registers are accessible, the diagnostic code reads information about an error condition that is stored in the diagnostic registers. It is possible that the diagnostic code will read multiple registers, either a predetermined set of registers, registers selected as a function of the type of error, or registers selected in response to the information read from other registers. For example, the diagnostic code may identify a second register that may yield more detailed information in response to the information obtained from reading a first register. The depth and complexity of the analysis may vary in order to identify or analyze a specific failed module, cable, circuit card or a certain component on a circuit card.

Memory and I/O mapping is enabled and disabled via a master locking bit and certain error interrupt conditions occur. The Master Locking bit or "Master Enable Signal" is output by general chipset decoding logic to lock multiple registers. The locking bit is a single control bit that can hide or lock a group of diagnostic registers all at one time. However, embodiments of the present invention can override the Master Locking bit under certain conditions described herein.

The "error interrupt signals" are normal and automatic system signals that occur in response to an error condition. An error interrupt signal may be used to trigger the unhiding or unlocking of a diagnostic register or group of diagnostic registers, but only for a short time interval during which the diagnostic code needs access to those registers. The registers are then re-hidden or locked when the diagnostic code no longer needs to access the registers.

The mechanism for re-hiding the registers may include, for example, one of the following: (1) the diagnostic registers may be re-hidden by a programmable timer interval after the original error signal condition occurred (error interrupt) whereby the diagnostic code has a fixed interval to read the registers, (2) the diagnostic code may have the responsibility to issue an instruction to re-hide the registers (for example, by writing a new bit in a normally unhidden register called the "Re-hide the diagnostic register bit", or (3) the rehiding event may be controlled by electrical signaling such that when the original error interrupt signal changes state to indicate a general error condition, that signal drives another electrical signal, which is controlled by digital logic gates known in the art, to rehide the diagnostic registers once the interrupt signal changes state a $2^{nd}$ time indicating the error condition has ended (thus creating a brief interval in which the diagnostic registers remain unhidden or unlocked). An example time period for the unhidden register state may be in microseconds or milliseconds.

In one embodiment, the memory and I/O mapping may have a "read once" attribute when first unlocked via an error interrupt. Accordingly, the register contents may only be accessed or read one time before the diagnostic registers are automatically re-hidden or re-locked. Only upon the occurrence of another error condition will the diagnostic registers again become accessible.

In one option, the error signal that is used for unlocking the diagnostic registers or error status registers may be a Systems Management Interrupt (SMI). An SMI is one of several types of interrupt signals used in an x86 architecture and may be used to trigger the unhiding/unlocking of the diagnostic registers. In other embodiments, other interrupt types may also be used.

In another option, the memory or I/O mapping addressing decode logic may change the address value of a specific diagnostic register every time data is read from that specific diagnostic register. By changing the address value after each read operation, the address decode logic can provide further security beyond just hiding or locking the register. In one non-limiting example, the address value of a certain diagnostic register could change according to a certain security key or sequence that is predetermined and known to both the address decode logic and the diagnostic code. One such sequence might involve rotating one or more of the address bits according to a known sequence. Then, as the registers become unhidden and are read in accordance with various embodiments of the invention, the register address value associated with a specific diagnostic register would change each time the diagnostic code reads data from the register, such that subsequent attempts to read a diagnostic register using a previously used address value would be unsuccessful. It should be recognized that an implementation that includes changing address values of the diagnostic registers may be used in combination with read-once methods described herein.

A rotating sequence is a basic 'security key' method of encrypting information. This method may be applied to the decode logic of a digital computer in a novel way to replace the typical fixed address decode logic. A changing register address will thwart "sniffing" of the address bus by a hacker who may be interested in knowing the addresses of the diagnostic registers, since the observed address will no longer be valid. This changing register address also protects against unauthorized reading of the register during the brief period that the diagnostic register is unhidden. The sequence may follow a simple repeating sequence, follow a basic mathematical equation, or implement some type of pseudo random pattern. Regardless of the exact nature of the pattern, the pattern can be quantified as part of the logic design of the CPU and thus the diagnostic software may have knowledge of the sequence and subsequently read the diagnostic registers at the next address in the pattern or sequence.

FIG. 1 is a diagram of a system 10 for selectively enabling a Primary Address Decode Logic device 30 in accordance with one embodiment of the present invention. The system 10 includes a central processing unit (CPU) 20 that includes the Primary Address Decode Logic device 30 and a group of registers 32, which are referred to herein as "diagnostic registers". These diagnostic registers are generally accessible during the Power On Self-Test (POST), but the Processor Decode Logic 34 designed into the CPU 20 disables access to this group of registers by providing the Master Enable signal to the enable input 36 of the Primary Address Decode Logic device 30.

The Primary Address Decode Logic device or module 30 decodes addresses for the hideable registers 32. Based on the Register Select bits (see bits A13-A15 at point 38) that are input to the device, the Primary Address Decode Logic device 30 activates one of the Chip Selects (CS) 40 to allow access to an individual one of the hideable registers 32.

Rather than connecting the Master Enable Signal directly to the enable input 36 of the Primary Address Decode Logic device 30 so as to disable that decoder from selecting any of the hidden registers 32 via the Chip Selects (CS), embodiments of the present invention include an Interrupt Unhide Logic device 50, in the form of a D flip-flop, that may override the Master Enable Signal output from the Processor Decode Logic 34. The D flip-flop forming the Interrupt Unhide Logic device 50 includes a data input (D), a clock input (CLK), a set input ("Set"), and an output (Q) coupled to the enable input 36 of the Primary Address Decode Logic device 30. The output (Q) of the D flip-flop is determined by the inputs. If either or both of CLK and Set are "false", then the output (Q) is the same as the input D, which is the Master Enable signal from the Processor Decode Logic 34. In other words, unless both CLK and SET are "true", the Master Enable signal is passed through to the enable input 36. If both CLK and Set are "true", then the output (Q) is "true" regardless of the state of the Master Enable signal at input D. This may be referred to as "overriding" the Master Enable signal.

The signal to the CLK input is determined by a separate Address Decode Logic device, module or chip 52, which determines whether a memory address (shown as a 16 bit memory address, A0-A15) in a read request issued by the Diagnostic Code 12 is within the address range of the hideable diagnostic registers 32. This address range is predetermined and either stored or designed into a circuit 54. The output of this separate address decode logic is a single logic signal indicating an attempt to access one of the hidden registers. As illustrated, a NOT gate 56 and an Exclusive OR (XOR) gate 58 are used to assure a "False" output from the Address Decode Logic device 52 unless the memory address value is within the address range of the diagnostic registers 32. The output of the XOR gate 58 is input to a clock (CLK) input of the D flip-flop that forms the Interrupt Unhide Logic device 50, which may be viewed as a memory cell. Since the CLK input to the D flip-flop is edge-triggered, the positive edge of the CLK input signal activates storing the Master Enable Signal (i.e., the D input) into a memory element within the D flip-flop.

Furthermore, the output from the XOR gate 58 (i.e., the CLK input) is ANDed with the interrupt signal (i.e., the SET input), and the output of the AND gate (not shown) determines whether the signal output to the Enable input 36 of the Primary Address Decode Logic device 30 is the Master Enable signal (input D) or a "true" override signal. Accordingly, one of the registers 32 can only be read (i.e., is only decoded normally) if both the interrupt signal (input Set) is Active and the Address Decode Logic device 52 indicates that the memory address in the read request is within the address range of the hidden diagnostic registers 32. The overall function of the address decode with SMI interrupt may be characterized in the following table:

| ADDRESS Range | SMI | Decode Logic Output |
|---|---|---|
| Normal unhidden or unlocked Address Space | Doesn't matter | Active, for each decoded Address |
| Hidden Registers | Inactive | Inactive, and no data is returned for this register |
| Hidden Registers | Active | Active, data is returned |

Once the Primary Address Decode Logic has been enabled, a subsequently attempted access to one of the diagnostic registers 32 (any register in the full hidden address range) is allowed. However, in certain embodiments, after the desired diagnostic register has been read or written once, further access to the registers is prevented. For example, the output of the D flip-flop no longer overrides the Master Enable signal, such that the Primary Address Decode Logic device 30 is disabled. Specifically, the occurrence of that Read or Write access to the register within the address range will "clock" the D flip-flop and move the state of the Master Enable signal back into the flip-flop memory. In the case where the Processor Decode Logic 34 has caused the Master Enable to be "false" (or the equivalents "inactive" or "0"), then the Primary Address Decode Logic device 30 becomes disabled again and the registers 32 are again hidden.

The Primary Address Decode Logic is preferably enabled for only a very short predetermined period of time that is sufficient only to allow reading of the hidden register. Embodiments of the invention may use several alternative ways to implement a delay interval. In a first example, the flip-flop memory element 50 provides a Read-Once or Write-Once ability when registers have been hidden. In a second example, multiple flip-flop memory elements are provided in series in order to provide multiple unit delays that will re-hide the register after an equal number of valid accesses to the register. In a third example, the flip-flop memory element may include a timer logic element, such that an interrupt signal activates the timer to provide a "true" result for a preset or programmable time period before returning to a "false" result. The timer output is used to "qualify" or "gate" the output (Q).

The illustrated Primary Address Decode Logic device 30 has three "Enable" inputs and all three must be Active ("true") for the device 30 to decode the memory address of the diagnostic register. In other words, if even one of the Enable inputs goes Inactive for a certain address, then that memory location or register location cannot be accessed and no data can be read or written (it looks hidden). So, the first two unused Enable inputs of the decoder are permanently connected to ground in order to keep those inputs active (the round circle on that wire means negative logic, so this input is "Active Low"). Accordingly, the "override" signal from the flip-flop output (Q) determines whether or not the registers are hidden or accessible.

Figure 2:
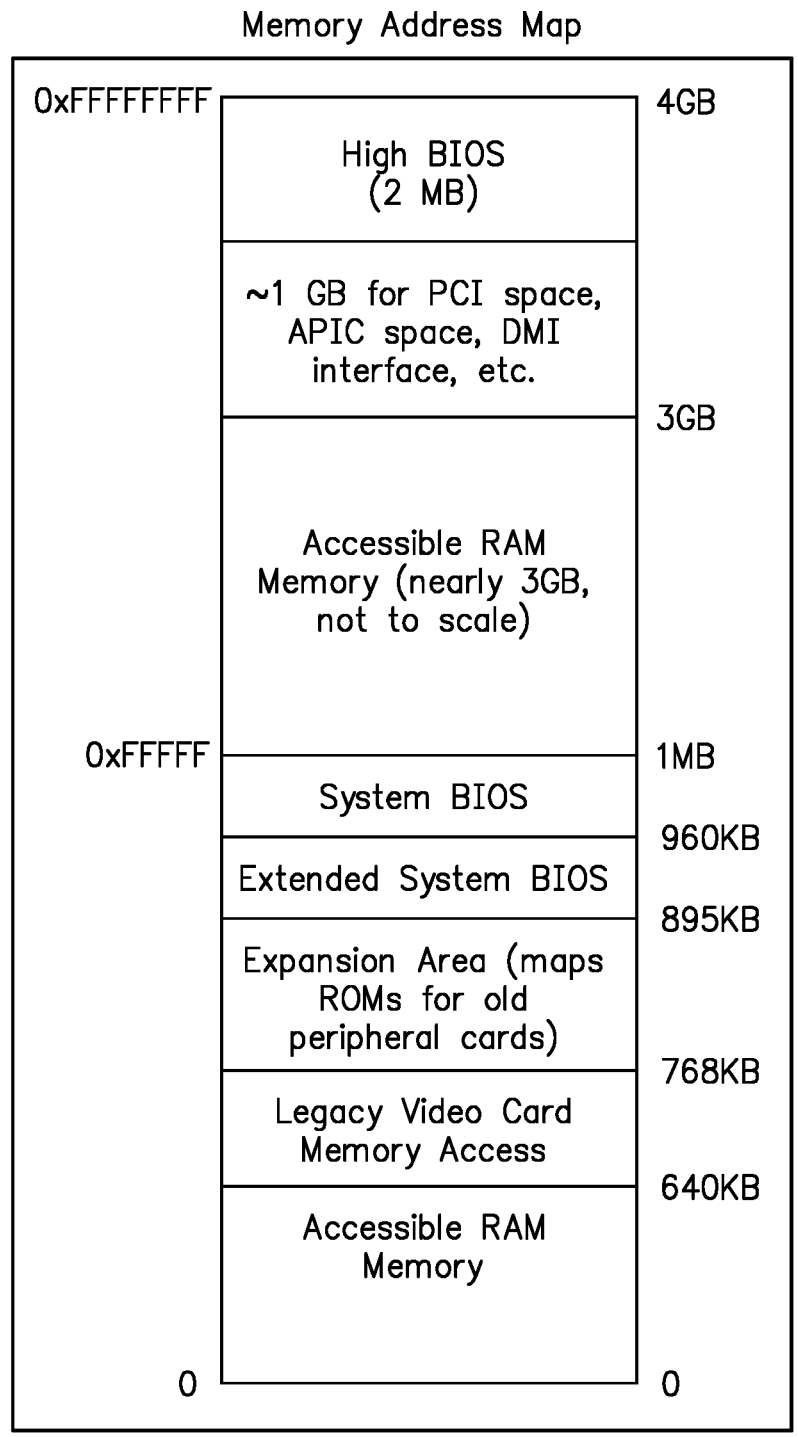
FIG. 2 is a memory address map.

FIG. 2 is a diagram illustrating an example of a Memory Address Map. The diagram shows the Address on the left (in hexadecimal format) and the register definition and the main usage description in the column. This diagram illustrates the general 4 GB memory space, but more memory may be addressable. When the memory map includes I/O registers for control purposes, those I/O registers are known as Memory Mapped I/O. There is a separate I/O address space and associated I/O map, but it is a very small space and so the trend is to decode I/O registers into the much larger Memory space.

The I/O registers that are hidden or locked may be located (or decoded) anywhere in this map, such as in the lower 640 KB, extended system bios, accessible RAM memory (the 3 GB space), 1 GB for PCIe space, high BIOS area, or even above the 4 GB boundary where additional addressing is available by the latest Intel chipsets. A more detailed memory map might show a smaller area of memory/register map, in a byte-by-byte listing and even a bit definition of every bit on each register (8 bits, 16 bits, etc.). Programmers sometimes use registers for writing out commands to various onboard and external devices and reading status registers to get information back from those devices.

Figure 3:
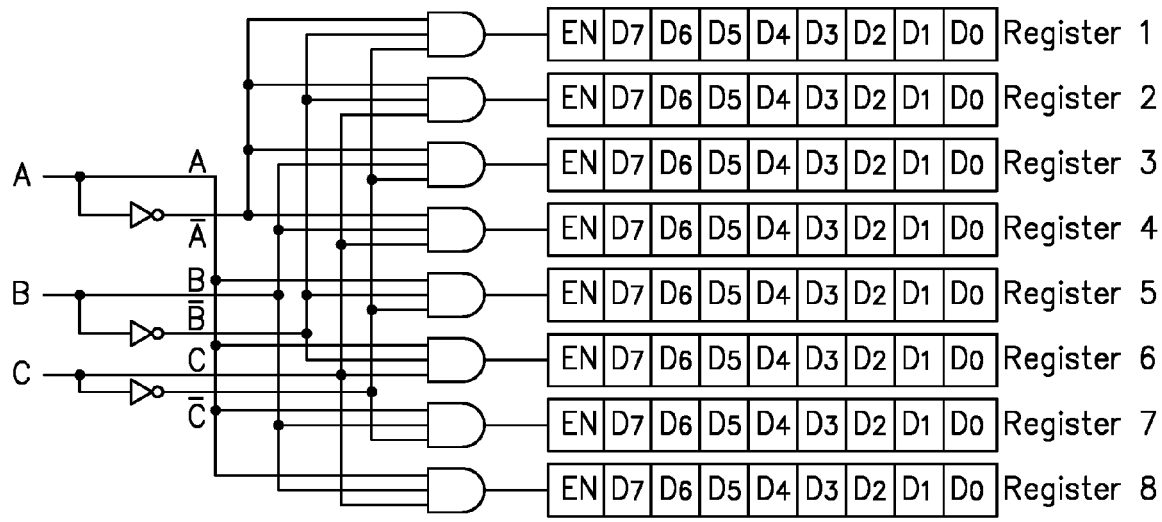
FIG. 3 is a diagram illustrating a basic address decode logic diagram.

FIG. 3 is a diagram illustrating a basic address decode logic diagram. In this example, three address bits (A, B, and C) are decoded into 8 different output signals that will drive the Enable signal on an I/O register. Only one of the outputs of the AND gates will go Active at any one point in time according to one of the 8 possible combinations of the address bits (000, 001, 010, 011, 100, 101, 110, and 111). However, a typical Intel computer today will have either 32 bits or 64 bits (compared with the three bits used in this example) which gives an enormous address space.

Figure 4:
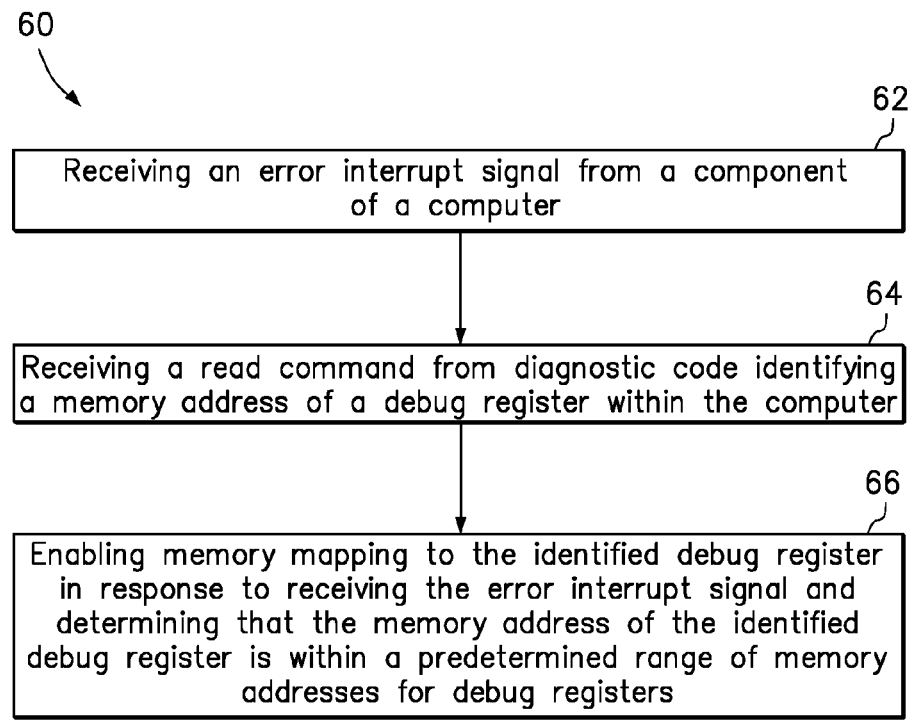
FIG. 4 is a flowchart of a method according to one embodiment of the present invention.

FIG. 4 is a flowchart of a method 60 according to one embodiment of the present invention. Step 62 includes receiving an error interrupt signal from a component of a computer. Step 64 includes receiving a read command from diagnostic code identifying a memory address of a diagnostic register within the computer. Step 66 includes enabling memory mapping to the identified diagnostic register in response to receiving the error interrupt signal and determining that the memory address of the identified diagnostic register is within a predetermined range of memory addresses for diagnostic registers. With memory mapping enabled, the diagnostic code may read the content of the identified diagnostic register. In various embodiments described herein, the memory mapping is then disabled upon satisfying one or more conditions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system, comprising:
   a central processing unit including a primary address decode logic module and a plurality of diagnostic registers, wherein the primary address decode logic module includes inputs from an address bus, inputs from register select lines, and an enable input port;

a data flip-flop having a data input coupled to a master enable signal line, a set input coupled to an error interrupt signal line, an output coupled to the enable input port of the primary address decode logic module, and a clock input; and an address decode logic module having an input receiving a memory address and an output indicating whether the memory address is within a predetermined address range of the diagnostic registers, wherein the output of the address decode logic module is coupled to the clock input of the data flip-flop.

2. The system of claim 1, wherein the address decode logic module provides a false output unless the memory address is within the predetermined address range of the diagnostic registers.

3. The system of claim 2, wherein an address within the predetermined address range of the diagnostic registers causes the address decode logic to output a true signal to the clock input such that the data flip-flop loads the state of the master enable signal into a memory element within the D flip-flop.

4. The system of claim 3, wherein a true signal to the set input and a true signal to the clock input causes the output of the data flip-flop to enable the primary address decode logic module.

5. The system of claim 4, wherein enabling the primary address decode logic module allows a diagnostic register associated with the memory address value to be accessed.

6. They system of claim 5, wherein reading from or writing to the diagnostic register returns the state of the master enable signal back into the flip-flop memory and onto the data flip-flop output to the enable input port of the primary address decode logic module.

7. The system of claim 1, wherein the central processing unit executes diagnostic code for reading one or more of the diagnostic registers in response to an error interrupt signal.

8. The system of claim 1, wherein the diagnostic code is selected from UEFI code, BMC service processor code, and a diagnostic application program.

9. The system of claim 1, wherein the system is selected from a computing server, desktop computer, laptop computer, and mobile computing device.

10. The system of claim 1, further comprising:
a timer establishing a limited time period during which the data flip-flop can override the master enable signal.

11. A method, comprising:
receiving an error interrupt signal from a component of a computer at a set input of a data flip-flop;
receiving a read command from diagnostic code identifying a memory address of a diagnostic register within the computer, wherein the memory address is received at an address decode logic module and a primary address decode logic module; and
enabling memory mapping by the primary address decode logic module to the identified diagnostic register in response to receiving the error interrupt signal at the set input of the data flip-flop, receiving a master enable signal at a data input to the data flip-flop, and receiving a signal at a clock input of the data flip-flop indicating that the memory address of the identified diagnostic register is within a predetermined range of memory addresses for diagnostic registers.

12. The method of claim 11, wherein the master enable signal is received from decode logic of a chipset of the computer, wherein the master enable signal indicates that memory mapping to the diagnostic registers should be disabled, and wherein enabling memory mapping to the identified diagnostic register in response to receiving the error interrupt signal and determining that the memory address of the identified diagnostic register is within a predetermined range of memory addresses for diagnostic registers, includes overriding the master enable signal.

13. The method of claim 11, further comprising:
reading the content of the identified diagnostic register; and
automatically disabling the memory mapping to the diagnostic registers in response to reading the content of the identified diagnostic register.

14. The method of claim 13, further comprising:
changing the memory address associated with the identified diagnostic register each time the diagnostic register is read.

15. The method of claim 11, wherein the identified diagnostic register stores information about an error condition associated with the error interrupt signal.

16. The method of claim 11, further comprising:
the diagnostic code reading multiple diagnostic registers while memory mapping is enabled.

17. The method of claim 11, further comprising:
reading a first diagnostic register to identify a type of the error; and
reading a second diagnostic register to identify a source of the error, wherein the second register is selected on the basis of the type of the error read from the first register.

18. The method of claim 11, wherein the error interrupt signal is a system management interrupt.

19. The method of claim 11, further comprising:
disabling memory mapping to the diagnostic registers in response to expiration of a time interval after enabling memory mapping to the diagnostic registers.

20. The method of claim 11, further comprising:
disabling memory mapping to the diagnostic registers in response to the diagnostic code issuing an instruction to disable memory mapping to the diagnostic registers.

* * * * *